(12) United States Patent
Nolletti

(10) Patent No.: US 8,081,415 B2
(45) Date of Patent: Dec. 20, 2011

(54) GROUNDING ASSEMBLY

(75) Inventor: Vincent Nolletti, Fresno, CA (US)

(73) Assignee: Paige Electric Company, L.P., Union, NJ (US)

( * ) Notice: Subject to any disclaimer, the term of this patent is extended or adjusted under 35 U.S.C. 154(b) by 386 days.

(21) Appl. No.: 12/425,031

(22) Filed: Apr. 16, 2009

(65) Prior Publication Data

US 2010/0263897 A1 Oct. 21, 2010

(51) Int. Cl.
*H01H 47/00* (2006.01)
*H05F 3/00* (2006.01)
*H05F 3/02* (2006.01)
*H02H 9/00* (2006.01)

(52) U.S. Cl. ........... 361/220; 361/222; 361/219; 361/56

(58) Field of Classification Search .................. 361/220, 361/222, 219, 56
See application file for complete search history.

(56) References Cited

U.S. PATENT DOCUMENTS

| | | | |
|---|---|---|---|
| 688,855 A | 12/1901 | Immich | |
| 3,345,542 A * | 10/1967 | Paddock et al. | 361/728 |
| 3,991,264 A * | 11/1976 | Connell | 174/38 |
| 4,621,476 A | 11/1986 | MacGregor | |
| 5,422,440 A | 6/1995 | Palma | |
| 5,801,327 A | 9/1998 | Tobias | |
| 5,998,731 A | 12/1999 | Takamura | |
| 6,633,001 B2 | 10/2003 | Gasque, Jr. | |
| 6,730,848 B1 | 5/2004 | Antaya et al. | |
| 7,102,256 B2 | 9/2006 | Murakami | |
| 7,173,181 B2 | 2/2007 | Park | |
| 2007/0074892 A1 | 4/2007 | Hibbard | |

* cited by examiner

*Primary Examiner* — Jared Fureman
*Assistant Examiner* — Lucy Thomas
(74) *Attorney, Agent, or Firm* — Cook Alex Ltd.

(57) ABSTRACT

A grounding assembly for electronic equipment provides a discharge path for the energy arising from lightning strikes. A conductive strap connects the ground lug of the equipment to a ground plate buried in the earth. The conductive strap has a length, width and thickness, with the width being greater than the thickness. This reduces the inductance of the conductor from the controller to the ground plate, thereby enhancing the ability of the grounding assembly to dissipate energy from lightning strikes.

17 Claims, 4 Drawing Sheets

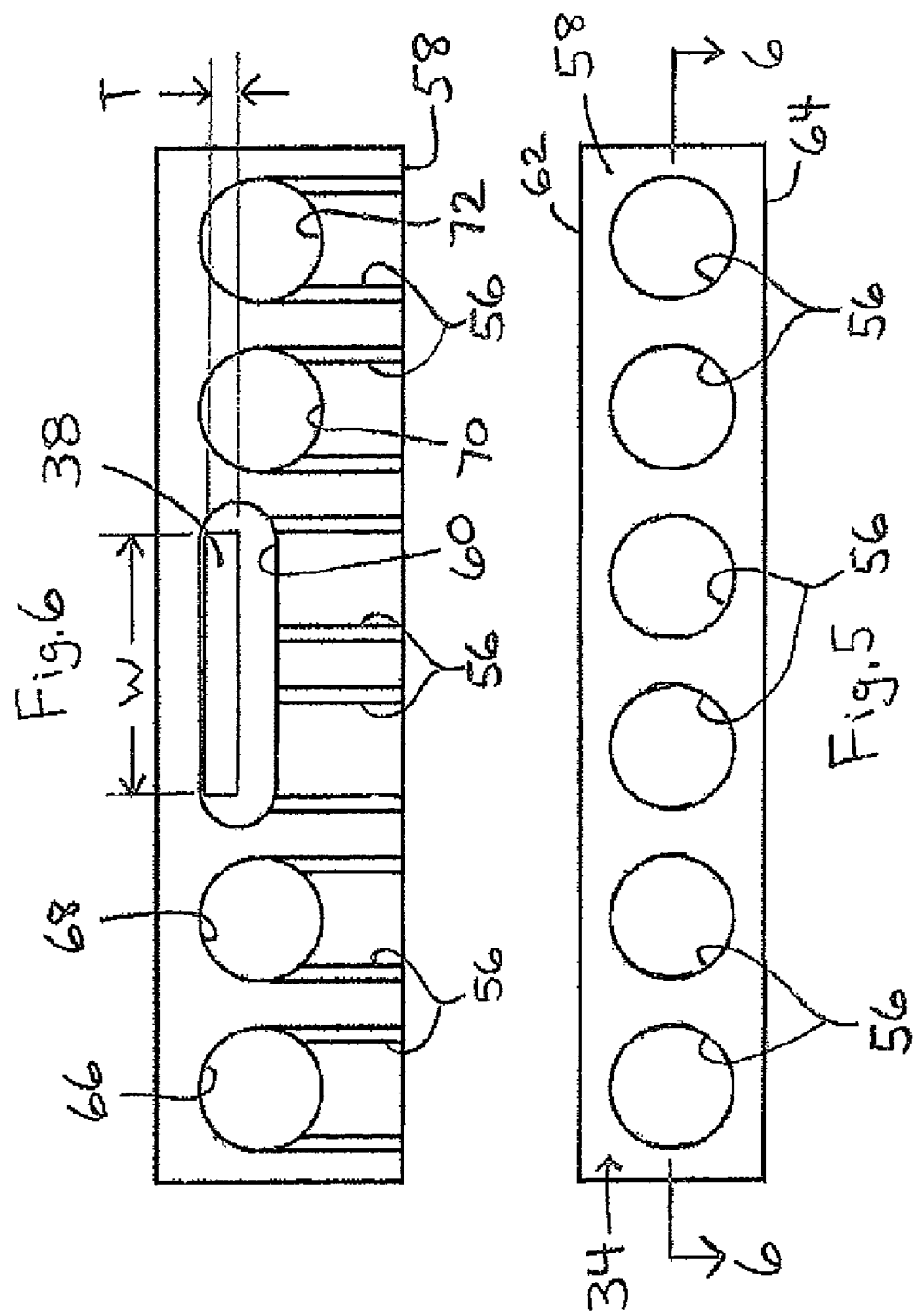

GROUNDING ASSEMBLY

BACKGROUND

The present application relates to grounding assemblies for electronic equipment and particularly relates to grounding assemblies for use with outdoor electronic equipment that is subject to being damaged by lightning. An example of such electronic equipment is the electronic controllers used on irrigation systems, such as those used on golf courses and the like. Irrigation systems include numerous sprinkler heads located throughout a property which are turned on and off by a plurality of solenoid valves located at or near the valves. The solenoid valves have control boards which are typically connected to a central control computer and a power source by wires buried under ground. Lightning striking the ground far from a particular control board can induce voltage spikes in the wires leading to the control board that can destroy the board. Lightning arrestors are typically incorporated in such equipment to prevent this but for such arrestors to protect the equipment adequately they must have an effective connection to ground.

It is the responsibility of the installer to connect all electronic irrigation equipment to earth ground in accordance with Article 250 of the National Electrical Code (NEC.) Grounding, bonding, and shielding components will, at a minimum, include the following items. Earth grounding must be done with grounding electrodes that are UL listed or manufactured to meet the minimum requirements of Article 250.52 of the 2008 edition of the NEC. At the very minimum, the grounding circuit will include a copper clad steel ground rod, a solid copper ground plate installed under ground and in contact with a suitable amount of an earth contact material, such as the carbon backfill products sold under the trademarks PowerSet or PowerFill by Loresco International of Hattiesburg, Miss. This is the minimum requirement for supplementary grounding of any electronic equipment.

FIGS. 1 and 2 illustrate the components required for supplementary grounding. The electronic equipment, such as an irrigation controller, is shown at 10. A ground rod 12 has a minimum diameter of ⅝ inches and a minimum length of 10 feet. The ground rod 12 is driven into the ground in a vertical position or an oblique angle not to exceed 45 degrees at a location 10 feet from the electronic equipment 10, the ground plate 14, or the wire 16 connecting the ground plate 14 to the equipment 10, as shown in FIG. 1. A 6 AWG solid bare copper wire 18 (about 12 feet long) is connected at 19 to the ground rod 12 by the installer using an exothermic welded connection, such as that provided by the Cadweld® GR1161G "One-Shot" welding kit available from Erico International Corporation of Solon, Ohio. The wire 18 shall be connected to the electronic equipment's ground lug.

The copper ground plate 14 must meet the minimum requirements of Article 250.52(A)(7) of the 2008 NEC. It is made of a copper alloy intended for grounding applications and has minimum dimensions of 4 in.×96 in.×0.0625 in. A 25-foot continuous length (no splices allowed unless using exothermic welding process) of 6 AWG solid, round, bare copper wire 16 is attached to the plate by the manufacturer using an approved welding process. This wire 16 is also connected to the electronic equipment's ground lug. In the past the round wire 16 has sometimes been replaced with a braided copper strap for connecting the electronic equipment to the ground plate 14. But braided copper straps have complicated geometry that contributes to higher inductance characteristics. The ground plate 14 is to be installed to a minimum depth of 30 inches, or below the frost line if the frost line is lower than 30 inches, at a location 8 feet from the electronic equipment 10 and underground wire 18. A suitable amount of earth contact material 20 must be spread so that it surrounds the copper grounding plate 14 evenly along its length within a 6 inch wide trench. Salts, fertilizers, bentonite clay, cement, coke, carbon, and other chemicals are not to be used to improve soil conductivity because these materials are corrosive and will cause the copper electrodes to erode and become less effective with time.

The grounding circuit components are to be installed in straight lines, to the extent possible, with no sharp turns. To prevent the electrode-discharged energy from re-entering the underground wires, all electrodes are installed away from such wires. The spacing between any two electrodes is as shown in FIGS. 1 and 2, so that they don't compete for the same soil.

The earth-to-ground resistance of this circuit is to be no more than 10 ohms. If the resistance is more than 10 ohms, additional ground plates and earth contact material are to be installed in the direction of an irrigated area at a distance of 10 feet, 12 feet, 14 feet, etc. It is required that the soil surrounding copper electrodes be kept at a minimum moisture level of 15% at all times by dedicating an irrigation station at each controller location. The irrigated area should include a circle with a 10-foot radius around the ground rod 12 and a rectangle measuring 1-foot×24-feet around the plate 14. All underground circuit connections are to be made using an exothermic welding process by utilizing products such as the Cadweld® "One-Shot" kits. Solder cannot be used to make these connections.

The above grounding circuit is referred-to as supplementary/auxiliary grounding in the NEC. For safety reasons the NEC requires that all supplementary grounds be bonded to each other and to the service entrance ground (power source). This is also the recommended practice of IEEE Standard 1100-1999. Note that this is in addition to the equipment ground, which is commonly referred to as "the green wire." The black (line or hot), white (neutral), and green wires must always be kept together in a trench, conduit, tray or the like. The bonding conductors are to be 6 AWG solid bare copper unless the system power conductors are larger than 1/0 AWG, in which case they are to be 4 AWG solid bare copper. All splices to the bonding conductors shall be made using an exothermic welding process.

SUMMARY

The present invention concerns an improved grounding assembly that is used to ground outdoor electronic equipment, such as irrigation controllers in a fixed irrigation system, for the purpose of providing a discharge path for the lightning induced voltage spikes. The grounding assembly comprises a ground plate and an electrically conductive strap. The conductive strap is electrically connected to the ground plate and electrically connectable to the electronic equipment. The conductive strap has a length, width and thickness. The width of the conductive strap is greater than the thickness. In a preferred embodiment the thickness of the conductive strap is about the same as the thickness of the ground plate and the strap has a generally rectangular cross section. Since flat conductors have lower inductance characteristics than round conductors, this reduces the inductance from the electronic equipment to the ground plate. Lightning follows the path of least inductance. Accordingly, the conductive strap of the present invention improves the ability of the grounding assembly to discharge the energy from lightning and thereby protect the electronic equipment.

These and other desired benefits of the invention, including combinations of features thereof, will become apparent from the following description. It will be understood, however, that a device could still appropriate the claimed invention without accomplishing each and every one of these desired benefits, including those gleaned from the following description. The appended claims, not these desired benefits, define the subject matter of the invention.

BRIEF DESCRIPTION OF THE DRAWINGS

FIG. 5 is a front elevation view of the ground bar.

FIG. 6 is a section taken along line 6-6 of FIG. 5, with the conductive strap also shown in its slot.

DETAILED DESCRIPTION

Figure 1:
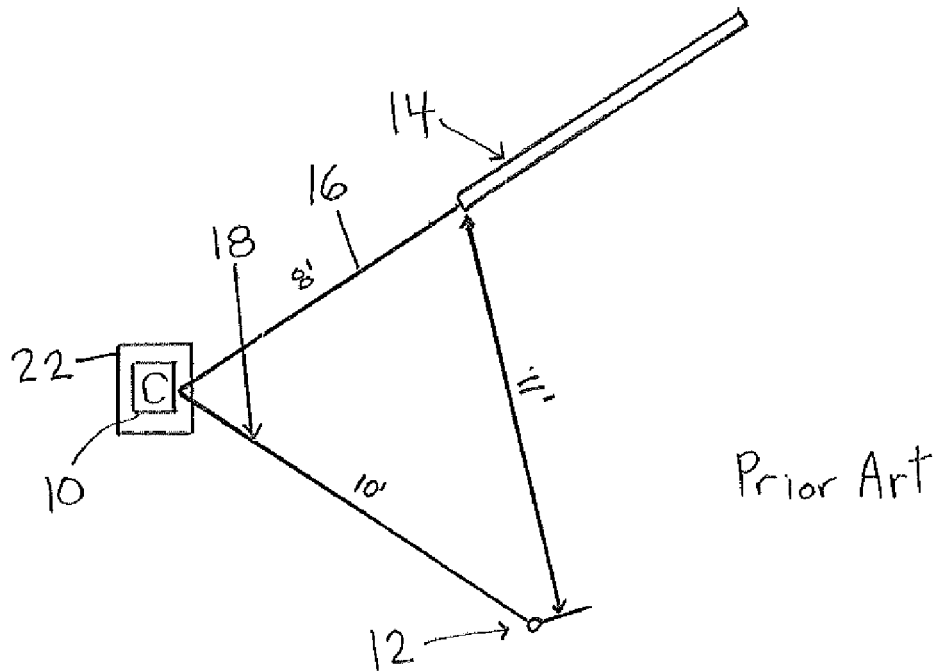
FIG. 1 is a schematic plan view of the layout of a prior art ground assembly.
Figure 2:
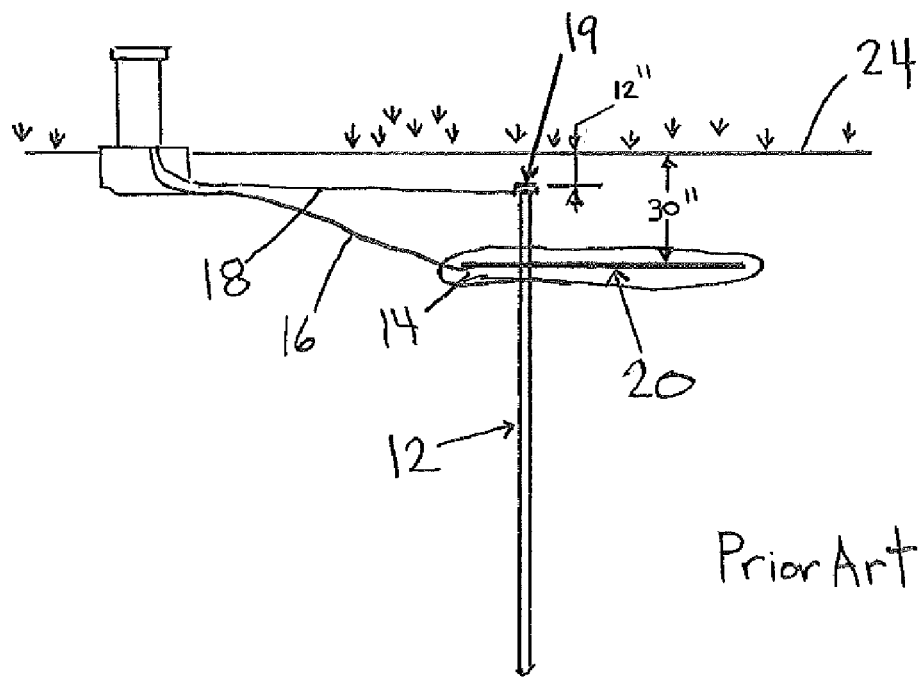
FIG. 2 is a schematic side elevation view of a prior art ground assembly.
Figure 3:
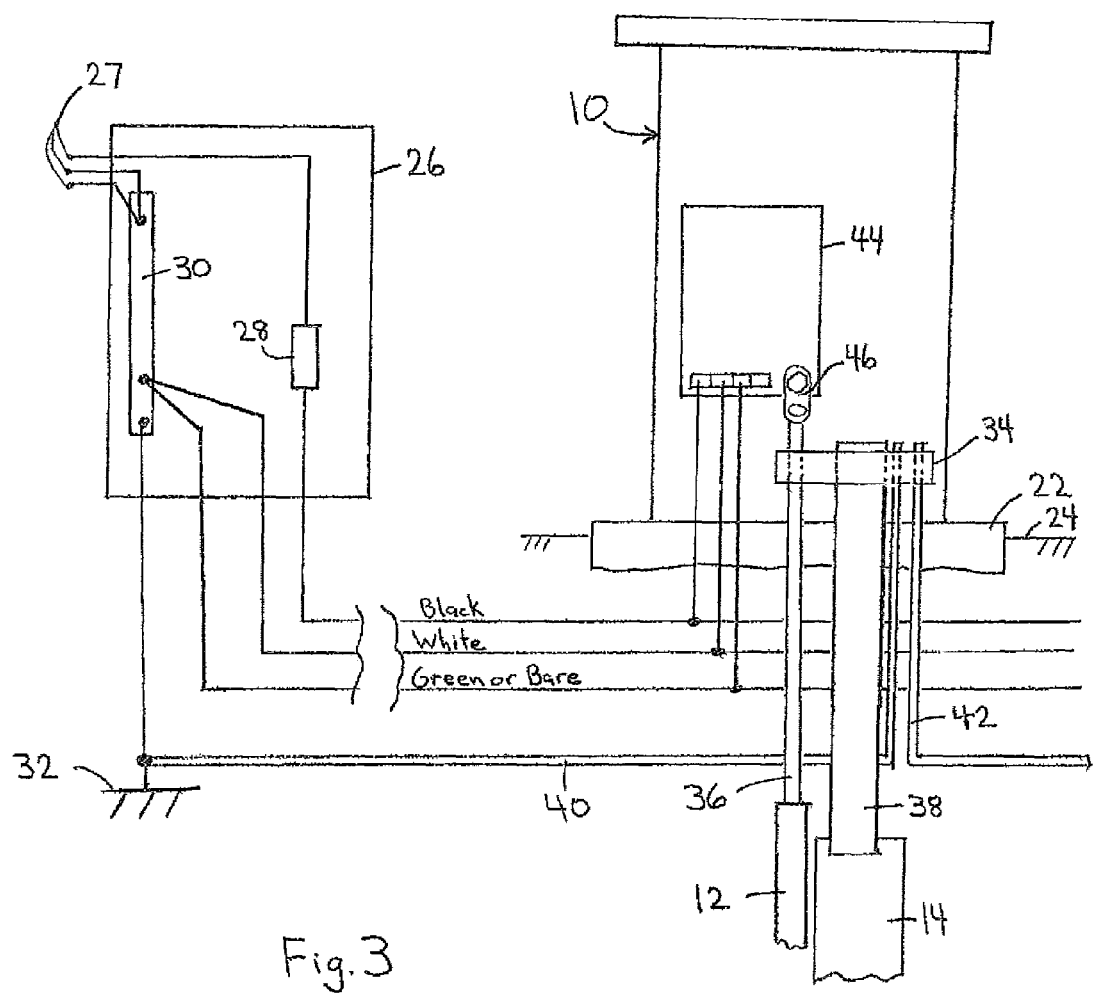
FIG. 3 is a schematic circuit diagram of the system in which the ground assembly of the present invention may be incorporated.

FIG. 3 is a circuit diagram of the system in which the ground assembly of the present invention may be used. The electronic equipment is shown generally at 10. In this case it is shown as an irrigation controller but it will be understood that other types of electronic equipment could utilize the ground assembly of the present invention. The controller is mounted on a pad 22 on the ground 24. The controller receives electric power from power lines which in this case are labeled black for line or hot, white for neutral and green or bare for equipment ground. The power lines are connected to a service entrance indicated schematically at box 26. A power source from the utility company indicated schematically at 27 connects to a fuse or circuit breaker 28. A ground bus bar 30 is also provided, with the white and green lines connected thereto. An earth ground 32 is provided by the utility company.

The enclosure for the electronic equipment may also house a ground bar shown schematically in FIG. 3 at 34. Details of the ground bar will be described below. The ground bar 34 connects to a ground wire 36, a conductive strap 38, and bonding conductors 40 and 42. Bonding conductor 40 joins the utility earth ground 32, while bonding conductor 42 extends to other controllers. The conductive strap 38 connects the ground bar 34 to the ground plate 14. The ground wire 36 is fixed to a ground lug 46 on the electronic equipment for connecting to the ground bar 34. In the illustrated embodiment the ground wire continues from the bar 34 to the ground rod 12. Alternately, a separate wire could be used for connecting the ground bar to the ground rod.

Figure 4:
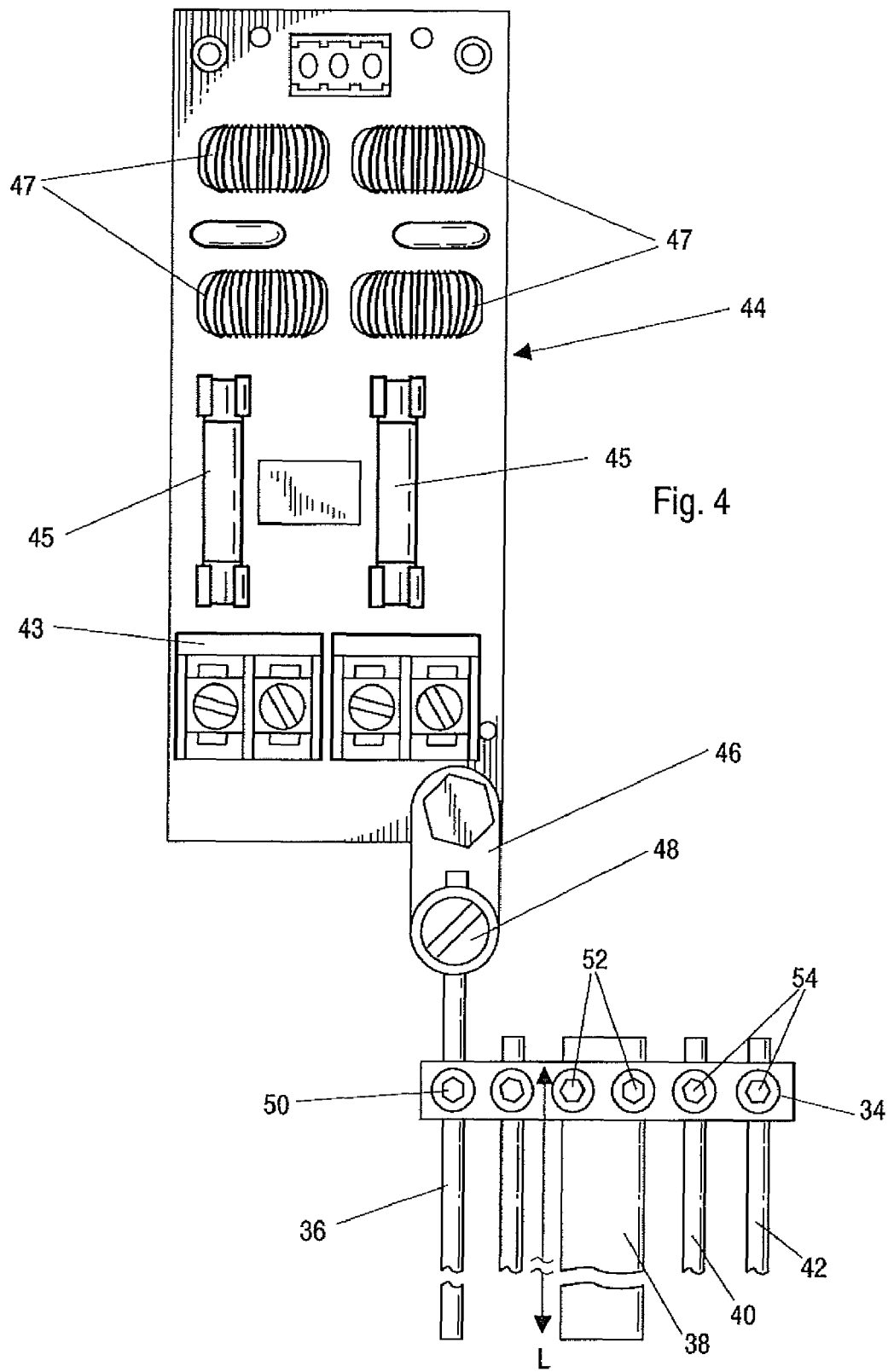
FIG. 4 is a front elevation view of a printed circuit board for an irrigation controller, a ground wire connecting the wire to a ground bar, and a conductive strap and bonding wires.

Further details are shown in FIG. 4. The irrigation controller includes at least two printed circuit boards, one of which is shown at 44. Board 44 is a lightning protection board that contains lightning arrestors. It will be understood that other possible arrangements of the various circuit boards are possible and that the lightning protection components could be incorporated in boards having multiple functions, such as an output board or a communication system boards. It is connected to other boards (not shown) that contains the circuit elements for interpreting control signals from a central control computer and actuating one or more solenoid valves in accordance with the control signals. The lightning protection board 44 has components designed to protect it and the second board from lightning induced spikes coming in through any wire connected to the controller. The lightning protection board 44 has a ground lug 46 affixed thereto. A connector block 43 receives the underground wires. Sets of fuses 45 and chokes 47 are provided. The chokes have high inductance which prevents spikes associated with the high frequency lightning strikes on the ground from passing to the second board. The high impedance caused by the chokes redirects such spikes to the ground lug 46 and conductive strap 38. The ground lug 46 has a set screw connector 48 attached to it for receiving the ground wire 36. The ground wire extends into and through the ground bar 34. It is held fixed in the ground bar by a set screw 50. The conductive strap 38 fits through a slot in the ground bar 34. Two set screws 52 hold the strap 38 in the slot. FIG. 4 also shows the bonding wires 40, 42 attached to the ground bar 34. A set screw 54 is used on each bonding wire to retain it in the ground bar.

The conductive strap 38 has a length L as seen in FIG. 4. It also has a width W and a thickness T (see FIG. 6). The width W is greater than the thickness T. Preferably, the thickness T is about the same as the thickness of the ground plate 14. For reference purposes only and not by way of limitation, the width W may be about ½" and the thickness T may be about 1/16". In the preferred embodiment shown the strap has a generally rectangular cross section but it could be otherwise so long as the width is greater than the thickness. This configuration affords a reduction in the inductance of the strap, as compared to a round wire. The lower inductance provides superior dissipation of energy from lightning strikes at high frequencies.

FIGS. 5 and 6 illustrate details of the ground bar 34. It is an elongated bar made of electrically conductive material, such as aluminum, although other materials could be used. A series of internally-threaded set screw openings 56 are formed in the front face 58. A slot 60 extends through the center of the bar, all the way from the top face 62 to and through the bottom face 64. Slot 60 is sized to receive the conductive strap 38 as described above. On either side of the slot 60 there is a pair of bores parallel to the slot. These similarly extend all the way through the ground bar 34. Bores 66, 68 are on one side of the slot, while bores 70, 72 are on the other side. Bore 66 receives the ground wire 36. Bores 70 and 72 receive the bonding wires 40, 42, respectively. Bore 68 is an unused spare in the illustrated version. It could be used if it were desired to separate the ground wire 36 into two separate wires. That is, one wire could extend from the lug 46 to bore 66 and a second, separate wire could extend from the bore 68 to the ground rod 12.

As can be seen from the above description, the present invention has several different aspects, which are not limited to the specific structures shown in the attached drawings and which do not necessarily need to be used together. Variations of these concepts or structures may be embodied in other structures without departing from the present invention as set forth in the appended claims. For example, the cross section of the conductive strap could vary from rectangular. It could have an oval cross section in which the major axis is greater than the minor axis. Or it could have a modified oval cross section with curved side edges and flat top and bottom surfaces. This could be made by starting with a round wire and squeezing it to flatten opposite sides of the wire. Preferably, the cross section has at least portions of the top and bottom surfaces that are planar. Most commonly these planar portions will also be parallel to one another, although they could have a non-parallel relationship. Although a relatively flat cross section is shown in the drawings, the cross section of the conductive strap could have any shape that has a lower inductance than a fully circular cross section.

In a further alternate construction the conductive strap and ground plate could be integrally formed from a single piece of copper. This would obviate the need to weld the two pieces together.

What is claimed is:

1. A grounding assembly providing a discharge path for lightning arrestors protecting electronic equipment, the grounding assembly comprising:
    a ground plate providing a discharge path terminus adapted for subterranean installation; and
    an electrically conductive strap having a first end and a second end, the first end connected to the ground plate and the second end electrically connectable to the electronic equipment, the conductive strap having a width and thickness, the width being greater than the thickness, wherein the ground plate has a thickness and wherein the thickness of the conductive strap is about the same as the thickness of the ground plate.

2. The grounding assembly of claim 1 wherein the thickness of the conductive strap and of the ground plate is about 0.0625 inches.

3. The grounding assembly of claim 2 wherein the conductive strap is about 0.5 inches wide.

4. The grounding assembly of claim 1 wherein the conductive strap is about 0.5 inches wide.

5. The grounding assembly of claim 1 wherein the conductive strap is made of copper.

6. The grounding assembly of claim 1 wherein the ground plate is made of copper.

7. The grounding assembly of claim 1 wherein the ground plate and conductive strap are formed from a unitary piece of material.

8. The grounding assembly of claim 1 further comprising a ground rod and a wire connecting the ground rod to the electronic equipment.

9. The grounding assembly of claim 1 further comprising a ground bar made of electrically conductive material and having at least one slot formed therein for receiving the conductive strap.

10. The grounding assembly of claim 9 further comprising a ground wire electrically connectable to the electronic equipment, and the ground bar further comprising at least one bore for receiving said ground wire.

11. In a grounding assembly for providing a discharge path for lightning arrestors protecting electronic equipment, the grounding assembly including a ground plate providing a discharge path terminus adapted for subterranean installation, a method of reducing the inductance from the electronic equipment to the ground plate, comprising the step of electrically connecting the electronic equipment to the ground plate with an electrically conductive strap having a first end and a second end, wherein the first end is connected to the ground plate and the second end is connectable to the electronic equipment, the conductive strap further comprising a width and thickness, the width being greater than the thickness and wherein the ground plate has a thickness and the thickness of the conductive strap is the about same as the thickness of the ground plate.

12. The method of claim 11 further comprising the steps of providing a ground bar made of electrically conductive material and having at least one slot and at least one bore formed therein, inserting the conductive strap into the slot, inserting a ground wire into the bore, and electrically connecting the ground wire to the electronic equipment.

13. A grounding assembly providing a discharge path for lightning arrestors protecting electronic equipment, the grounding assembly comprising:
    a ground plate providing a discharge path terminus adapted for subterranean installation; and
    an electrically conductive strap having a first end and a second end, the first end connected to the ground plate and the second end electrically connectable to the electronic equipment, the conductive strap having a cross sectional shape the inductance of which is less than that of a fully circular cross sectional shape.

14. The grounding assembly of claim 13 wherein the ground plate and the conductive strap each have a thickness and wherein the thickness of the conductive strap is about the same as the thickness of the ground plate.

15. The grounding assembly of claim 14 wherein the thickness of the conductive strap and of the ground plate is about 0.0625 inches.

16. The grounding assembly of claim 15 wherein the conductive strap is about 0.5 inches wide.

17. The grounding assembly of claim 13 wherein the conductive strap is about 0.5 inches wide.

* * * * *